(12) United States Patent
Kuhn et al.

(10) Patent No.: US 9,719,531 B2
(45) Date of Patent: Aug. 1, 2017

(54) DEVICE FOR VARYING THE VOLUMES OF A FIRST HYDRAULIC MACHINE AND A SECOND HYDRAULIC MACHINE

(71) Applicant: ZF Friedrichshafen AG, Friedrichshafen (DE)

(72) Inventors: Jan-Frederik Kuhn, Friedrichshafen (DE); Timo Maise, Flein (DE); Marcus Hiemer, Meckenbeuren (DE); Stephan Schinacher, Egesheim (DE); Sven Bieber, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 208 days.

(21) Appl. No.: 14/412,216

(22) PCT Filed: Jun. 5, 2013

(86) PCT No.: PCT/EP2013/061542
§ 371 (c)(1),
(2) Date: Dec. 31, 2014

(87) PCT Pub. No.: WO2014/016029
PCT Pub. Date: Jan. 30, 2014

(65) Prior Publication Data
US 2015/0345518 A1    Dec. 3, 2015

(30) Foreign Application Priority Data
Jul. 26, 2012    (DE) .................. 10 2012 213 173

(51) Int. Cl.
*F15B 11/16*    (2006.01)
*F15B 13/06*    (2006.01)
(Continued)

(52) U.S. Cl.
CPC .............. *F15B 11/16* (2013.01); *F15B 13/06* (2013.01); *F15B 21/001* (2013.01);
(Continued)

(58) Field of Classification Search
CPC ....... F16H 2039/005; F16H 2059/6861; F16H 61/421; F16H 61/431; F16H 61/4017;
(Continued)

(56) References Cited

U.S. PATENT DOCUMENTS 4,510,750 A     4/1985  Izumi et al.
4,776,751 A  *  10/1988 Saele .................... E02F 9/2253
                                                                414/697
(Continued)

FOREIGN PATENT DOCUMENTS

DE          37 13 799 A1     11/1988
DE    10 2007 047 513 A1      4/2009
(Continued)

OTHER PUBLICATIONS

German Search Report Corresponding to 10 2012 213 173.6 mailed Apr. 4, 2013.
(Continued)

*Primary Examiner* — Logan Kraft
(74) *Attorney, Agent, or Firm* — Davis & Bujold, PLLC; Michael J. Bujold

(57) ABSTRACT

A device for varying the swept volumes of first and second hydraulic machines, whose swept volumes depends upon pivoting positions of adjustable axes thereof which can be connected to one another by first and second lines. The axes can be coupled to a piston-cylinder device which is adjustable by a control valve unit for pivoting the axes. Pressures in the area of the hydraulic machines can be limited by the control valve unit. The control valve unit can be coupled to a respective first or second line with the highest pressure. A
(Continued)

device for determining an existing actual pressure is located upstream of the control valve unit, at least in the area of one of the first and the second lines that connects with the first and the second hydraulic machines. The control valve unit can be actuated based on the actual pressure value determined by the device.

10 Claims, 3 Drawing Sheets

(51) Int. Cl.
*F15B 21/00* (2006.01)
*F16H 61/421* (2010.01)
*F16H 61/431* (2010.01)
*F16H 61/4061* (2010.01)
*F16H 59/68* (2006.01)

(52) U.S. Cl.
CPC ......... *F16H 61/421* (2013.01); *F16H 61/431* (2013.01); *F15B 2211/253* (2013.01); *F15B 2211/6333* (2013.01); *F15B 2211/6652* (2013.01); *F16H 61/4061* (2013.01); *F16H 2059/6861* (2013.01)

(58) Field of Classification Search
CPC .... F16H 61/438; F16H 61/4061; F15B 11/16; F15B 13/06; F15B 21/001; F15B 2211/253; F15B 2211/6333; F15B 2211/6652

See application file for complete search history.

(56) References Cited

U.S. PATENT DOCUMENTS

| | | | |
|---|---|---|---|
| 5,070,695 A | 12/1991 | Metzner | |
| 8,478,496 B2 * | 7/2013 | Honzek | B60K 23/08 701/58 |
| 8,752,374 B2 | 6/2014 | Legner | |
| 9,016,053 B2 * | 4/2015 | Legner | F16H 61/421 60/452 |
| 2012/0285156 A1 | 11/2012 | Legner | |

FOREIGN PATENT DOCUMENTS

| | | |
|---|---|---|
| DE | 10 2009 045 510 A1 | 4/2011 |
| WO | 2009/047039 A1 | 4/2009 |

OTHER PUBLICATIONS

International Search Report Corresponding to PCT/EP2013/061542 mailed Aug. 13, 2013.
Written Opinion Corresponding to PCT/EP2013/061542 mailed Aug. 13, 2013.
International Preliminary Report on Patentability Corresponding to PCT/EP2013/061542 mailed Sep. 19, 2014.

* cited by examiner

DEVICE FOR VARYING THE VOLUMES OF A FIRST HYDRAULIC MACHINE AND A SECOND HYDRAULIC MACHINE

This application is a National Stage completion of PCT/EP2013/061542 filed Jun. 5, 2013, which claims priority from German patent application serial no. 10 2012 213 173.6 filed Jul. 26, 2012.

FIELD OF THE INVENTION

The invention concerns a device for varying the volumes of a first hydraulic machine and of a second hydraulic.

BACKGROUND OF THE INVENTION

From DE 10 2009 045 510 A1 a device for varying the swept volumes of a first hydraulic machine and of a second hydraulic machine is known. A piston of a piston-cylinder device is functionally connected to axes of the hydraulic machines. Depending on a power demand from the driver, the piston can be acted upon by way of a position-regulating valve unit and a high-pressure-regulating valve unit of a valve device or control valve device, in the area of a functional surface that delimits a piston space, with pressures that correspond to a hydraulic pressure present in the area of the hydraulic machines and that act in a first adjustment direction of the axes of the hydraulic machines. The pressure in the area of the hydraulic machines can be adjusted in a controlled manner by means of the position-regulating valve unit and can be limited in a controlled manner by means of the high-pressure-regulating valve unit. Furthermore, the piston can be acted upon by way of the valve device in the area of a further functional surface that delimits a further piston space, with pressures that correspond to a hydraulic pressure present in the area of the hydraulic machines and that acts in a second adjustment direction of the axes of the hydraulic machines, whereby the mode of operation of the position-regulating valve unit in the area of the high-pressure-regulating valve unit can be reversed.

Characteristic for a transmission constructed with the hydraulic machines and the associated device described above is the possibility of continuously variably adjusting the overall transmission ratio, and load-sensitivity. Both characteristics are achieved with the help of the hydraulic machines designed as axial piston machines. The transmission ratio of the transmission is varied continuously by pivoting axes of the hydraulic machines, this taking place by virtue of the position-regulating operating mode in the area of the device. Load-sensing is implemented in the high-pressure-regulating operating mode. A maximum high pressure in the area of the hydraulic machines can be limited by a control pressure that can be applied in the area of the device. If the high pressure demanded by the hydrostat or the hydraulic machines, for example due to an external torque as when a wheel loader is driven onto a pile of rubble, is larger than the maximum pressure permitted by the control system, the swept volumes of the hydraulic machines are changed by pivoting the axes during traction operation of a vehicle drive-train made with the transmission and by an associated reduction of the reciprocal transmission ratio, which corresponds to a brief pivoting of the hydrostat.

In the position-regulating operating mode an armature of a proportional magnet of the position-regulating valve unit is drawn into a solenoid by applying an actual current regulated by a current regulator. By virtue of the magnetic force produced, a slide of the position-regulating valve unit made as a 4/2 control valve is displaced. In the area of a feed line the position-regulating valve unit is connected to the low pressure of a substantially unpressurized zone or tank area. In the area of a further feed line the high pressure acting in the area of the hydraulic machines is applied to the position-regulating valve unit. The position of the valve slide of the position-regulating valve unit defines whether the low pressure or the high pressure is passed on in the direction of the high-pressure-regulating valve unit.

The position of the valve slide of the high-pressure-regulating valve unit is determined by an overall force component acting on the valve slide, which is composed of the spring force of a spring device and the pressures acting in the area of functional surfaces of the valve slide. In this case the high pressure acting in the area of the hydraulic machines is applied in the area of a first functional surface of the valve slide of the high-pressure-regulating valve unit. In addition, a control pressure can be applied to another functional surface of the valve slide of the high-pressure-regulating valve unit, this control pressure being variable, for example, by means of a control pressure valve current.

In the position-regulating operating mode the valve slide of the high-pressure-regulating valve unit is displaced by the spring force to its fully out-of-the-way end position, so that the piston of the piston-cylinder device is moved exclusively as determined by the pressure in the area of the position-regulating valve unit. The movement of the piston of the piston-cylinder device is relayed back to the position-regulating valve unit by a mechanical feedback mechanism, whereby the valve slide of the position-regulating valve unit moves to a stable position.

During the high-pressure-regulating operating mode, the valve slide of the high-pressure-regulating valve unit is displaced by the pressures acting in the area of the functional surfaces in opposition to the spring force of the spring device, to its second out-of-the-way end position, and the operating mode of the position-regulating valve unit is reversed.

To be able to adjust the swept volumes of the two hydraulic machines to the desired extent, it has to be ensured by way of a complex actuation logic that in relation to the valve slide of the high-pressure-regulating valve unit, the valve slide of the position-regulating valve unit adopts over the full operating range the appropriate positions in each case for the functioning of the device, in which the controlling hydraulic fluid volume flow triggers the desired system reaction and, for example, an undesired restriction of the dynamics or a reversal of the hydraulic fluid volume flow are avoided.

The complex logic provided for determining the appropriate valve setting of the position-regulating valve unit takes into account both measurable operating parameters of a transmission made with the hydraulic machines that form a hydrostat, and also transmission-internal parameters such as a current overall transmission ratio, internal gear ratios, and the rotational speed of the drive output.

In this, however, it is problematic that to obtain the desired or necessary system reaction in each case, very severe demands are imposed on the logic system in relation to robustness and speed.

SUMMARY OF THE INVENTION

Accordingly, the purpose of the present invention is to make available a simply designed and easily actuated device for varying the swept volumes of a first hydraulic machine and of a second hydraulic machine.

According to the invention this objective is achieved by a device having the characteristics described below.

In the device according to the invention for varying the swept volumes of a first hydraulic machine and of a second hydraulic machine, whose swept volumes in each case depend on the pivoted position of adjustable axes of the hydraulic machines and which can be connected to one another by lines, the axes can be coupled to a piston-cylinder device. In the area of functional surfaces the piston-cylinder device can be acted upon by pressures that can be adjusted in the area of the control valve unit in order to pivot the axes, whereas the pressures in the area of the hydraulic machines can be limited by the control valve unit and the control valve unit can be coupled to the line in which the pressure is highest.

According to the invention, a device for determining a currently existing actual pressure is provided upstream from the control valve unit and at least in the area of one of the lines connecting the hydraulic machines. In addition, the control valve unit can be actuated as a function of the actual pressure value that can be determined by the device.

The design of the device according to the invention, with the device for determining a currently existing actual pressure provided upstream from the control valve unit and at least in the area of one of the lines connecting the hydraulic machines, and in addition the actuation of the control valve unit according to the invention as a function of the actual pressure value that can be determined by the device, provides in a simple manner the possibility of implementing the position-regulating operating mode and the high-pressure-limiting operating mode with a control valve unit which is more simply designed compared with the system known from the prior art. This means that the control valve unit can for example be made only with the position-regulating valve unit of the system known from the prior art, and the function of the high-pressure-regulating valve unit can be carried out on the basis of the information from the device for determining the current actual pressure in the area upstream from the control valve unit and at least in the area of one of the lines connecting the hydraulic machines, and suitable actuation of the control valve unit is based upon that information.

By means of the device for determining the actual pressure, which for example comprises high-pressure sensors in the area upstream from the control valve unit and at least in the area of one of the lines connecting the hydraulic machines, or only one high-pressure sensor and a pressure-side switch in the indicated area, a load-sensing ability of a transmission made with the hydraulic machines can be realized regardless of the pressure side of the hydraulic machines during overdrive or traction operation of a vehicle drive-train made with such a transmission and regardless of the driving range engaged in the transmission at the time. Overdrive operation is understood to mean, for example, driving downhill during which, starting from the drive output or the wheels in overdrive, torque is introduced into the vehicle drive-train. During this the torque is not necessarily passed on toward the drive engine.

To obtain the load-sensing ability the amount and variation of the pressure determined by the device upstream from the control valve unit can be used to represent the load-sensing. In addition, the pressure side of the hydraulic machines can be determined by determining the actual pressure in the area of the line that connects the hydraulic machines and can be evaluated in combination with the actual pressure in the area upstream from the control valve unit by means of suitable software logic in order to be able to distinguish between overdrive and traction operation.

Depending on the information available from the device the transmission ratio of a transmission made with the hydraulic machines and the device according to the invention can be selectively adjusted to give slower or faster output speeds, and high-pressure limitation in the area of the hydraulic machines can be realized over the entire operating range of the transmission.

Furthermore, in the operating mode of high-pressure limitation or high-pressure regulation during traction operation of a vehicle drive-train made with the hydraulic machines and the device according to the invention, the operating condition of the control valve unit is changed by means of the control valve unit in order to adjust the overall transmission ratio of the transmission so as to give a slower output speed, whereas the overall transmission ratio of the transmission during overdrive operation is adjusted so as to give a faster output speed. In this context the expression "adjusted so as to give a faster output speed" is understood to mean an increase of the overall reciprocal transmission ratio of a transmission made with the hydraulic machines that form a hydrostat, whereas the expression "adjusted so as to give a slower output speed" means the same as reducing the overall reciprocal transmission ratio of the transmission.

By virtue of the device for determining a current actual pressure in the area upstream from the control valve unit and at least in the area of one of the lines that connect the hydraulic machines, the pressure sides of the two hydraulic machines can be recognized in a robust and simple manner, so that overdrive and traction cases can be distinguished. This forms the basis for the operating mode of high-pressure limitation or high-pressure regulation and thus the load-sensing of the transmission regardless of the pressure sides of the hydraulic machines and of the driving range engaged at the time in a continuously variable transmission made with the hydraulic machines.

Thanks to the possibility of making the control valve unit more simple compared with the solution known from the prior art, and preferably being able to do without the high-pressure-regulating valve unit, the device according to the invention needs no hardware for actuating a high-pressure-regulating valve unit, such as a pressure regulator or wiring. Moreover, calibration and diagnostic functions for the high-pressure-regulating valve unit with extensive case differentiations are no longer needed.

Furthermore, thanks to the possibility of omitting the high-pressure-regulating valve unit there also occur no function-critical valve positions between the high-pressure-regulating valve unit and the position-regulating valve unit, which in the device known from the prior art have to be avoided by means of correspondingly complex logic. The system according to the invention can be implemented without mechanical positive feedback and a limitation of the system's dynamics by the respective other valve unit, for example by positive overlap or even due to a small aperture cross-section, is prevented. Moreover, the actuation complexity of the control valve unit with only one valve unit corresponding to the position-regulating valve unit is reduced, since to implement the desired functionality only one valve unit has to be energized.

Owing to the design of the device according to the invention, the high-pressure limiting function also does not depend on the system pressure. Thus, for example, with the solution known from the prior art, which is system pressure dependent, the possibility exists that very low pressures for adjusting the axes of the hydraulic machines in the area of the piston-cylinder device cannot be regulated to the desired extent.

The reason for this is that the control pressure applied to the high-pressure-regulating valve unit depends on the system pressure, since the system pressure is the supply pressure of the pressure regulator for producing the control pressure applied to the high-pressure-regulating valve unit. A problem arises when the system pressure or supply pressure of the pressure regulator for producing the control pressure applied to the high-pressure-regulating valve unit falls below the maximum actuation range of the control pressure, since in that range the high-pressure-regulating valve unit can no longer be operated. For example, a system pressure reduced to that extent exists when the driving rotational speed of a hydraulic pump supplying the hydraulic system with hydraulic fluid is too low, and/or when the viscosity of the hydraulic fluid is too high, for example during a cold start.

Furthermore, it is advantageous that the adjustable axes of the hydraulic machines, which for example can be connected to one another by means of a double yoke, are always actuated and pivoted by the same valve unit over the entire operating range of the hydraulic machines and the transmission made with the hydraulic machines. In that way direct control over the position of the axes or of the double yoke, and hence over the gear ratio of the transmission made with the hydraulic machines, is always ensured, and for example a correction of the pivot position during a driving range change in the transmission can be used.

Since in contrast to the movement of the valve slide of the high-pressure-regulating valve unit, the movement of the valve slide of the position-regulating valve unit is not influenced mechanically by the pressure applied, with the device according to the invention the possibility exists of carrying out any desired type of filtering of pressure fluctuations that lead to control of the gear ratio. For example, situation-dependent filtering is advantageous during a reversing process and a driving range change.

In addition, it can be provided that the existing actual pressure in the area of one of the lines connecting the hydraulic machines and downstream from a valve device functionally connected to both of the lines that connect the hydraulic machines, preferably in the form of a two-way valve, is determined by the device. In that case the line section provided downstream from the valve device is always connected by way of the valve device with that line connecting the hydraulic machines, in which the currently higher pressure is present.

Alternatively, it can also be provided that the actual pressure is determined by the device in the area of the lines connecting the hydraulic machines to one another, or at least in a line section connected thereto. Then, to distinguish between overdrive and traction operation the maximum of the pressures in the lines has to be determined and then the desired high-pressure limiting can be carried out.

In a particularly simply designed embodiment of the device according to the invention the control valve unit is in the form of a 4/2 control valve, whose valve slide can be displaced by a variable control force in opposition to a preferably variable further control force acting on the valve slide, from a first end position in the direction toward a second end position.

If a piston of the preferably double-action piston-cylinder device is functionally connected to the valve slide of the control valve unit and if the further control force acting on the valve slide varies as a function of a position of the piston, the valve slide of the control valve unit moves to a stable position with little effort.

In a simply designed and inexpensive embodiment of the device according to the invention, the control force acting on the valve slide of the control valve unit can be varied as a function of a gear ratio of a transmission device made with the hydraulic machines, that can be determined in the area of a device and that varies as a function of the swept volumes of the hydraulic machines, since there is no need for a mechanical feedback connection between the piston-cylinder device and the control valve unit. Furthermore, compared with a mechanical connection between the piston-cylinder device and the control valve unit a better resolution of the actuation unit can be obtained, since when a mechanically coupled system with feedback is used, in certain situations the high pressure changes very markedly with only a small variation of the actuation of the control valve unit.

In the last-described embodiment of the device according to the invention without any mechanical feedback between the piston and the control valve unit, the entire force regulation range of a proportional magnet can be used for the high-resolution adjustment of the volume flow in the area of the control valve unit. This has particular advantages when the control valve unit is used to adjust the load-sensing ability of a transmission made with the hydraulic machines. Moreover, the behavior of the system can be predicted more exactly since the volume flow can be adjusted directly in the area of the control valve unit, uninfluenced by the pivoting of the hydrostat.

If the swept volumes of the hydraulic machines above a preferably variable pressure limit value in the area of the lines that connect the hydraulic machines to one another can be brought by a corresponding adjustment of the control force acting on the valve slide of the control valve unit to values at which the pressure in the lines is at a level at least approximately corresponding to the pressure limit value, the high-pressure limiting or high-pressure-regulating operating mode can be implemented to the desired extent with a safety margin relative to a high pressure value that could in some circumstances cause damage in the area of the hydraulic machines and the components actuating them, so that inadmissibly high pressure values in the hydraulic system can be avoided with a high degree of probability.

Furthermore, in addition to protection of the transmission, the maximum high pressure acting in the area of the hydraulic machines can also be reduced so that, for example, the handling of a wheel loader during operation on rubble or the like can be improved, preferably by the avoidance of wheel-spin. Load-sensing of a CVT transmission can be obtained to a desired or necessary extent in combination with an appropriate nominal-pressure specification, for example by virtue of a driver's wish, a specification by a driving strategy computer, or even as a function of a brake pressure required for protecting the transmission. In general, by virtue of the simply available high-pressure limitation adjustable as a function of the operating situation, sensitive handling can be achieved, for example when operating on rubble.

If the pressure limit value is lower or equal to a nominal pressure value to be set in the area of the lines connecting the hydraulic machines, which value is required for the transmission of a defined torque between the hydraulic machines, then on the one hand the mode of operation of a transmission made with the hydraulic machines and the device according to the invention, and thus in turn that of a vehicle built with the transmission, at one and the same time avoids damaging operating conditions and achieves the desired load-sensing ability.

If an adjustment rate of the swept volumes of the hydraulic machines above the pressure limit value in the area of the lines that connect the hydraulic machines to one another can be varied as a function of a difference between an actual pressure value and the nominal pressure value in the area of the lines connecting the hydraulic machines, then operating conditions of the device that could in some circumstances prove damaging, i.e. inadmissibly high pressure values in the system, can be corrected in a short time whereas small differences between the actual and the specified nominal pressure values can be reduced less aggressively, without substantially compromising the driving comfort.

In a further advantageous embodiment of the device according to the invention, an adjustment rate of the swept volumes of the hydraulic machines above the pressure limit value in the area of the lines that connect the hydraulic machines to one another can be varied as a function of a gradient of the difference between the actual pressure and the nominal high pressure specified in the area of the lines connecting the hydraulic machines. This ensures that at larger gradients a correspondingly more vigorous action can be taken than with smaller gradients, and the system can in each case be protected against inadmissible operating conditions.

Depending on the particular embodiment of the device according to the invention used, both the starting point and the aggressiveness or adjustment rate of the swept volumes of the hydraulic machines can be adjusted as desired, by appropriate measures such as by software means. This provides the possibility of varying the valve characteristic of the control valve unit in an operating-condition-dependent manner, or being able to adapt it to the desired extent to the application at the time. In the system known from the prior art, which is designed with the high-pressure-regulating valve unit as well as with the position-regulating valve unit that is only possible by virtue of design measures. Accordingly, the device according to the invention provides a very flexible solution which can be adapted to various applications without expensive and time-consuming design modifications.

For example, by virtue of the device according to the invention the possibility is provided, to limit the traction force available in the area of the drive output of a vehicle drive-train made with the device according to the invention, the associated hydraulic machines and a transmission, as a function of a customer's wish, or the driving situation existing at the time, or the driving range currently engaged in the transmission, or a driver's wish to slow down and/or the current condition of the transmission, i.e. depending on whether it is operating in traction or in overdrive or whether the high-pressure-limiting function is active or not.

Both the characteristics indicated in the claims and those indicated in the example embodiments of the device according to the invention described below are in each case suitable as further developments of the object of the invention, whether considered alone or in any combination with one another. In relation to the further development of the object of the invention the respective combinations of characteristics described have no restrictive force, but are presented only as examples.

Further advantages and advantageous embodiments of the device according to the invention emerge from the claims and from the example embodiments whose principle is described below with reference to the drawing. In the description of the various example embodiments, for the sake of clarity the same indexes are used for structurally and functionally equivalent components.

DETAILED DESCRIPTION OF THE PREFERRED EMBODIMENTS

Figure 1:
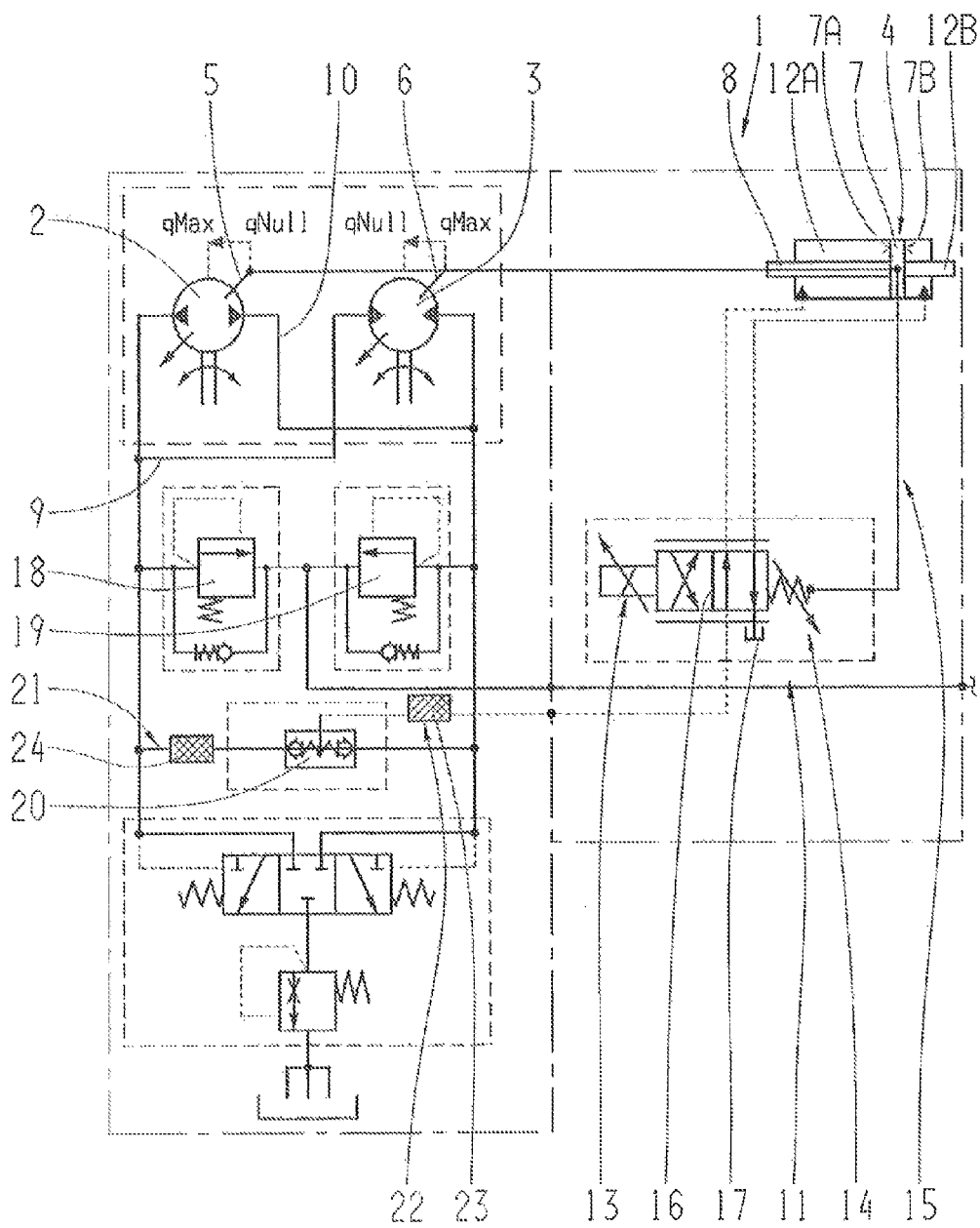
FIG. 1: A simplified hydraulic layout of the first example embodiment of the device according to the invention.

FIG. 1 shows a device 1 for varying the swept volumes of a first hydraulic machine 2 and of a second hydraulic machine 3, in each case made as oblique-axis piston machines whose swept volumes depend on the pivot positions of the respective axes 5, 6 of the hydraulic machines 2, 3 that can be conjointly adjusted by means of a common piston-cylinder device 4. A piston 7 of the piston-cylinder device 4 is functionally connected to the axes 5, 6 of the hydraulic machines 2, 3 by a piston rod 8.

The hydraulic machines 2, 3 are connected by lines 9, 10 and form a hydrostat device, which is part of the CVT transmission. By means of the hydraulic machines 2, 3, part of a torque delivered by a drive engine of a vehicle drive-train can be transmitted hydrostatically toward a drive output. Such CVT transmissions are used for example in wheel loaders, skidders or other building-site machines and forestry machines in which transmissions with continuously variable gear ratios are preferably used, and by virtue of which so-termed load-sensing is available.

The hydrostat unit comprising the hydraulic machines 2, 3 constitutes a first power branch of a CVT transmission, which is usually coupled with a mechanical device that forms a second power branch of a CVT transmission by way of which in turn the remainder of the torque of the drive engine can be transmitted between a transmission input and a transmission output. The two power branches are preferably functionally connected by a planetary gear system. Such CVT transmissions are preferably designed with a plurality of driving ranges for forward and reverse driving, each of which can be engaged and disengaged by means of at least one shifting element to be disengaged and at least one shifting element to be engaged, and within which a gear ratio of the CVT transmission can be varied continuously by changing the swept volumes of the hydraulic machines 2, 3. To be able to carry out the driving range change synchronously, the two hydraulic machines 2 and 3 can each be operated both as a pump and as a motor.

Below, the function of the device 1 in combination with a CUT transmission will be described, by means of which transmission in each case two driving ranges for forward and for reverse driving can be obtained. Other ranges too are possible.

When the first driving range is engaged in the CVT transmission and at the same time the vehicle is stationary, the device 1 is in a so-termed rest position and the first hydraulic machine 2 is operated as a pump, whereas the second hydraulic machine 3 is operating as a motor. The delivery volume of the first hydraulic machine 2 in this operating condition is minimal and the displacement volume of the second hydraulic machine 3 is a maximum, while the axes 5 and 6 of the two hydraulic machines are in the positions shown in FIG. 1.

In this case, with the piston-cylinder device 4 is associated a control valve unit 11 which constitutes a position-regulating valve and is designed as a 4/2 control valve. On the control valve unit there acts a hydraulic pressure respectively in the area of the hydraulic machines 2 and 3 or in the area of the lines 9 and 10, which pressure, when the control valve unit 11 is correspondingly actuated, can be applied in a first piston space 12A and in a second piston space 12B of the piston-cylinder device 4 to respective functional surfaces 7A and 7B of the piston 7. In this case the control valve unit 11 is connected via a valve device 20 to the line 9 or 10 in which the higher pressure is present.

In the example embodiment of the device 1 shown in the drawing, the control valve unit 11 is actuated by a proportional magnet 13, although the control valve unit 11 can also be actuated by a proportionally adjustable control pressure valve.

The actuating force of the proportional magnet 13 acts in opposition to a spring force of a spring device 14, whose spring force varies as a function of a mechanical link 15 of the spring device 14 to the piston 7 of the piston-cylinder device 4. By means of the mechanical link 15 the position of the piston 7 of the piston-cylinder device 4 is fed back to the control valve unit 11 or its valve slide 16 and the two hydraulic machines 2 and 3 are actuated in a controlled manner.

If the control force produced in the area of the proportional magnet 13 is larger than the spring force of the spring device 14 acting on the valve slide 16 of the control valve unit 11, then with the valve slide 16 of the control valve unit 11 in a position different from that shown in FIG. 1 the pressure present in the area of the hydraulic machines 2, 3 or the high pressure in the line 9 or in the line 10 is passed into the second piston space 12B of the piston-cylinder device 14 whereas the hydraulic fluid from the first piston space 12A drains away via the control valve unit 11 to an unpressurized area 17 or tank.

The result of this is that starting from the position shown in FIG. 1, the piston 7 together with its piston rod 8 are displaced and the volume of the first piston space 12A becomes smaller while the volume of the second piston space 12B becomes larger. Owing to the displacement of the piston rod 8 the delivery volume of the first hydraulic machine 2 operating as a pump increases, whereas the displacement volume of the second hydraulic machine 3 operating as a motor correspondingly decreases. If the force produced in the area of the proportional magnet 13 corresponds to the spring force of the spring device 14, then the position of the piston 7 is set.

The position of the piston 7 of the piston-cylinder device 4 at any time determines the respective transmission ratio between the swept volumes of the hydraulic machine 2 or 3 operating as a pump and the hydraulic machine 3 or 2 operating as a motor. If the hydrostatic device formed by the two hydraulic machines 2 and 3 is fitted into a secondarily coupled power branching transmission, the driving speed of a vehicle constructed with this transmission can be continuously adjusted or regulated.

By virtue of the control valve unit 11 a continuously variable pressure-limiting function can also be obtained over the full operating range of the hydraulic machines by appropriate actuation. The aim of the pressure-limiting function is that the pressure limitation in the area of the hydraulic machines 2 and 3 only takes place in emergency in the area of high-pressure limiting valves 18, 19, and hydraulic fluid in the area of the high-pressure limiting valves 18 and 19 is ejected from the high-pressure side to the low-pressure side. When pressure is limited by means of the high-pressure limiting valves 18 and 19 some power losses takes place, which very quickly overheat the hydrostatic gear system consisting of the two hydraulic machines 2 and 3 and which unnecessarily increase the fuel consumption of a drive engine—preferably in the form of an internal combustion engine—of a vehicle drive-train made with the CVT transmission.

The high-pressure limiting valves 18 and 19 are provided above all to safeguard the system during highly dynamic load changes, since these are carried out with a shorter response time than the control valve unit 11. This avoids undesired damage in the hydraulic system of the device 1, which cannot be prevented by the control valve unit 11 alone because of its slower response behavior.

By virtue of the pressure-limiting function a maximum high pressure in the area of the hydraulic machines 2 and 3 is limited to a pressure level lower than the opening pressure of the high-pressure limiting valves 18, 19. For example, if the response limit of the high-pressure limiting valves 18, 19 is 500 bar, the proportional magnet 13 is energized in such manner that the piston space 12A or the piston space 12B is acted upon by pressure and the swept volumes of the hydraulic machines 2 and 3 are changed in such a way that the high pressure in the system is kept below critical pressure values.

From the point in time when the control valve unit 11 responds, the drive output rotational speed of whichever hydraulic machine 2 or 3 is operating as a motor is reduced or its displacement volume increased. At the same time, the delivery volume of the hydraulic machine 3 or 2 that is operating as a pump is decreased and the power uptake is consequently reduced. By virtue of the device 1, the high-pressure limitation is made available over the full operating range of a CVT transmission, i.e. over all the driving ranges.

To be able to implement the high-pressure limiting function to the desired extent, the device 1 comprises a device 22 for determining a current actual pressure upstream from the control valve unit 11 in the area between the valve device 20 and the control valve unit 11 and upstream from the valve device 20 in a line section 21 connected to the line 9. In the present case the device 22 is formed with two high-pressure sensors 23, 24, by virtue of which load-sensing of a CVT transmission can be obtained regardless of the pressure side of the hydraulic machines 2 and 3 during overdrive or traction operation and regardless of the particular driving range engaged at the time in the CVT transmission.

For this, by means of the high-pressure sensor 23 the size and variation of the actual pressure in the area of the line 9 or 10 is determined. Furthermore, in combination with the high-pressure sensor 24 the pressure sides of the hydraulic machines 2 and 3 are determined and made available to software logic stored in a control unit as information, or input variables. By means of the software logic traction and overdrive operation are distinguished and, depending on the operating condition at the time, the transmission ratio of the CVT transmission is adjusted in a controlled manner so as to give a slower or a faster output speed, whereby the high pressure in the area of the hydraulic machines 2 and 3 can be limited over the entire operating range or in any driving situation. Here it is generally the case that to limit the high pressure during overdrive operation, the control valve unit 11 has to be actuated by a corresponding, software-controlled energizing of the proportional magnet 13 in such manner that the reciprocal transmission ratio of the CVT transmission is increased, whereas during overdrive operation the reciprocal transmission ratio for high-pressure limitation has to be reduced and the CVT transmission adjusted so as to give a lower output speed.

Basically, to implement the high-pressure limitation function both the size of the high pressure and also the information about whether operation is taking place in the overdrive or the traction mode must be available. For this, however, it is not absolutely necessary for the device 22 to be made with two high-pressure sensors. The device 22 can also be made with only one high-pressure sensor and a pressure-side switch.

Furthermore, the high-pressure sensor 24 can also be arranged in the line 10 or in a line section connected to the line 10, while the high-pressure sensor 23, as before, is provided between the valve device 20 and the control valve unit 11. In another alternative, the high-pressure sensor 23 can be arranged in the line 9 or in the line section 21 connected to the line 9, and the high-pressure sensor 24 in the line 10 or in a line section connected to the line 10. In order to be able to obtain load-sensing and also to protect the transmission by limiting the high-pressure to the extent described above by means of the device 22, it is first preferable by software means to determine the maximum of the pressures determined by the high-pressure sensors 23 and 24. Then, the high-pressure limitation can be carried out to the desired extent during both traction and overdrive operation.

If in the area of the line 9 or the line 10 the high pressure exceeds a predefined pressure limit and if the CVT transmission is operating in the traction mode, a traction force limitation can be carried out quite generally by adjusting the CVT transmission so as to give a lower output speed. In the case when the CVT transmission is made with two driving ranges and the device is made with the control valve unit 11 in the manner shown in FIG. 1, then the control valve unit 11 should be changed by means of the proportional magnet 13 and the spring device 14 to the position shown in FIG. 1, wherein the valve slide 16 is then in the transmitting position. In the second driving range the valve slide 16 should be changed to the blocking position and for this the proportional magnet 13 must be energized appropriately. In general, for high-pressure limitation during traction operation the CVT transmission must be adjusted so as to give a lower output speed by means of the control valve unit 11 until the desired high pressure or the desired traction force is produced.

In overdrive operation, in general the traction force or the high pressure can be limited by adjusting the CVCT transmission so as to give a faster output speed. For this, when the first driving range is engaged in the CVT transmission the control valve unit 11 should be changed to the blocking position, whereas when the second driving range is engaged it should be brought to the transmitting position shown in FIG. 1.

In these cases the adjustment to give a slower output speed during traction operation or to give a faster output speed during overdrive operation are always carried out until the high pressure measured in the area of the line 9 or the line 10 is equal to the specified maximum nominal high pressure. Load-sensitivity of the CVT transmission can be achieved to the desired or necessary extent in combination with a selective maximum nominal pressure specification, for example in accordance with a driver's wish, the specifications from a driving strategy computer, or even as a function of a required brake pressure for transmission protection.

Figure 2:
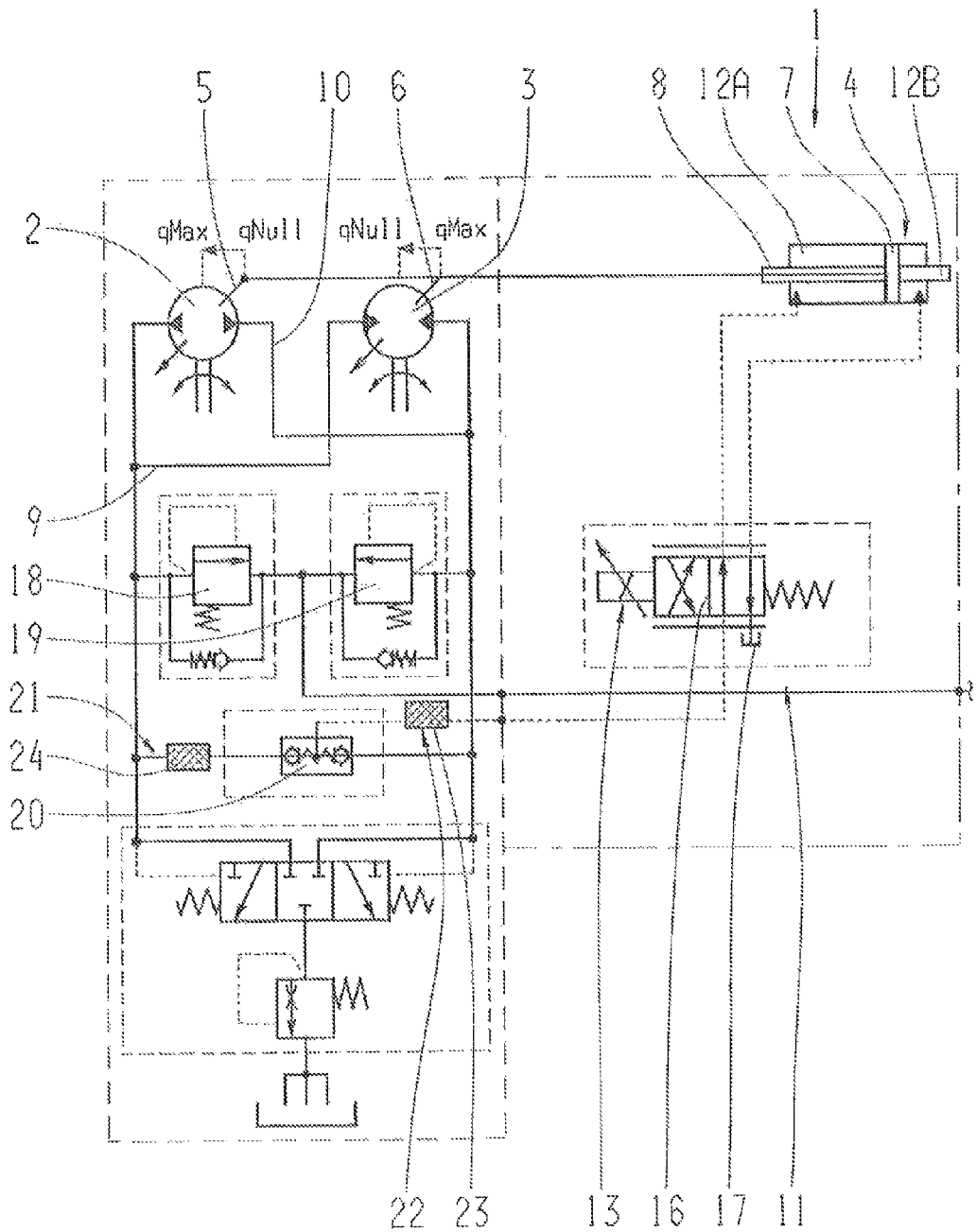
FIG. 2: A representation corresponding to that of FIG. 1, showing a second example embodiment of the device according to the invention.

The design of the example embodiment of the device 1 shown in FIG. 2 differs from that of the example embodiment shown in FIG. 1 in that the device 1 according to FIG. 2 is made without the mechanical link 15. To be able to produce by means of the device 1 according to FIG. 2 the stable setting of a transmission ratio in the area of the two hydraulic machines 2 and 3 which was achieved by virtue of the mechanical feedback provided by the mechanical link 15, the control valve unit 11 of the device 1 according to FIG. 2 or its proportional magnet 13 is actuated additionally as a function of the varying transmission ratio, itself in turn depending on the swept volumes of the hydraulic machines 2 and 3 of the CVT transmission made with the hydraulic machines 2 and 3. For this, for example, signals from rotational speed sensors or from a pivot-angle sensor for detecting the pivot angles of the axes 5 and 6 of the hydraulic machines 2 and 3, provided in the area of the CVT transmission, can be used to detect whether the currently engaged actual transmission ratio of the CVT transmission corresponds to the required nominal transmission ratio. If so, further adjustment of the piston 7 is prevented in that by virtue of appropriate actuation or energizing of the proportional magnet 13, the hydraulic fluid volume flow passing through the control valve unit 11 is cut to zero.

Figure 3:
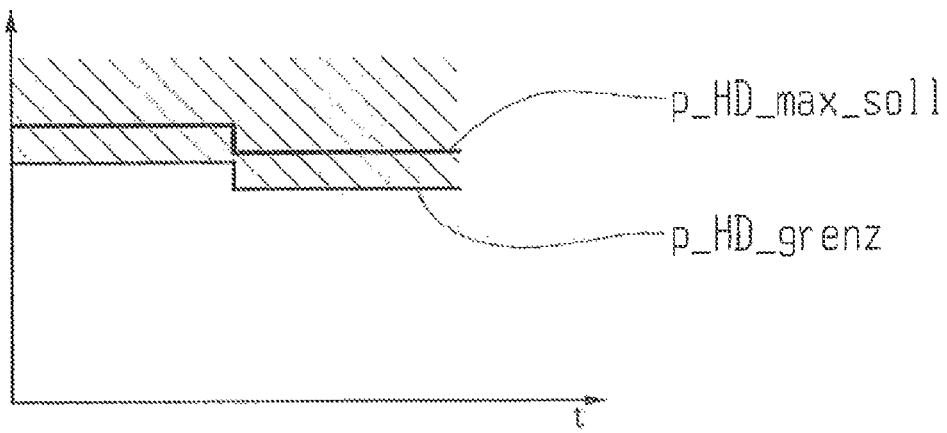
FIG. 3: A schematic representation of the active range of a high-pressure-limiting function that can be obtained by means of the device according to the invention.

FIG. 3 shows the variations of a maximum nominal high-pressure specification p_HD_max_soll and a pressure limit value p_HD_grenz as functions of time. The pressure limit value p_HD_grenz is in this case lower than the maximum nominal high-pressure specification p_HD_max_soll by an offset value. By virtue of the offset value or pressure difference between the pressure limit value p_HD_grenz and the maximum nominal high-pressure specification p_HD_max_soll, the action point of the high-pressure limitation function is defined in the devices 1 according to both FIG. 1 and FIG. 2, and the area in which the high-pressure limitation function operates is correspondingly established. This means that the high-pressure limitation function, which takes place by appropriate energization of the proportional magnet 13, becomes active as soon as the actual value of the pressure in the area of the lines 9 and 10 rises above the pressure limit value p_HD_grenz.

The offset value or pressure difference between the pressure limit value p_HD_grenz and the maximum nominal high-pressure specification p_HD_max_soll can be freely chosen as a parameter. For example, it is possible with a larger offset value to chose a smaller adjustment rate of the swept volumes of the hydraulic machines 2 and 3 and have a traction force limitation with a more gentle variation, giving greater driving comfort. Moreover, with larger offset values the critical pressure values in the area of the hydraulic machines, which compromise the operation of the CVT transmission, can most probably be avoided if the high-pressure limitation is carried out with a sufficient margin of separation from a maximum possible nominal high-pressure specification.

Figure 4:
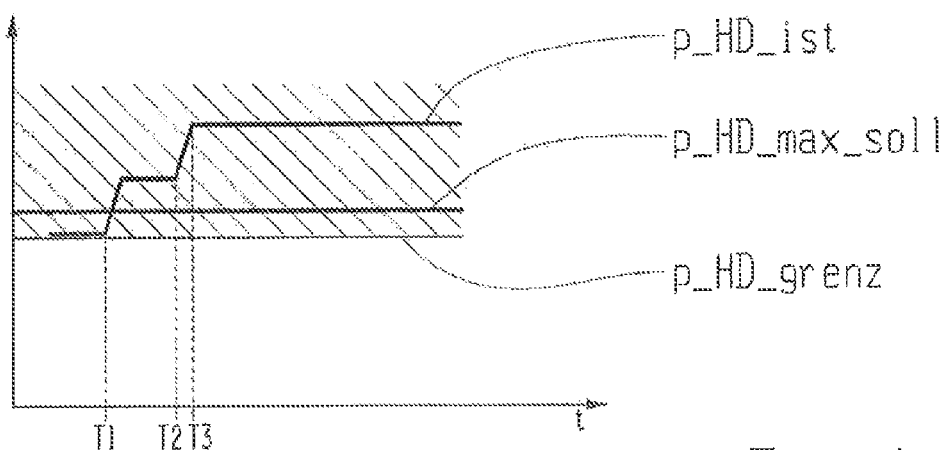
FIG. 4: A schematic representation of the dependence of the adjustment rate of the swept volumes of the hydraulic machines shown in FIGS. 1 and 2, as a function of a difference between an actual pressure and a nominal pressure.
Figure 5:
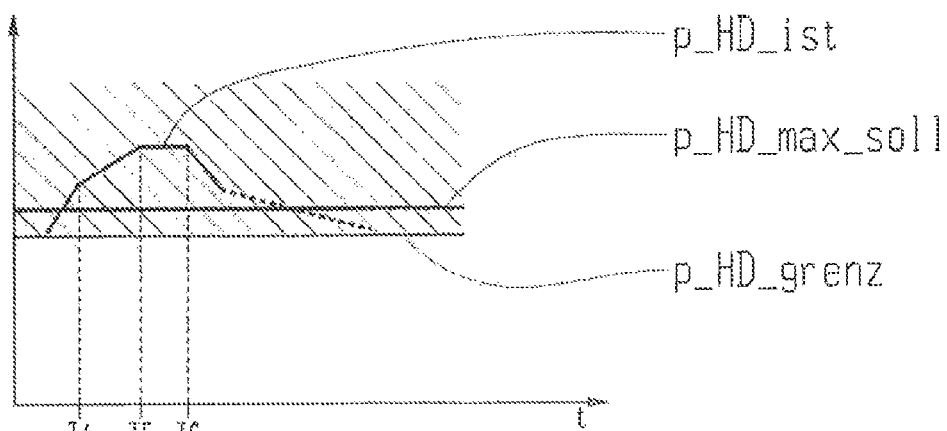
FIG. 5: A representation corresponding to that of FIG. 4, showing the variations of an actual pressure and a nominal pressure, with reference to which a possible variation of the adjustment rate of the swept volumes of the hydraulic machines according to FIGS. 1 and 2 will be explained in more detail.

FIGS. 4 and 5 show, in each case, variations of the pressure limit value p_HD_grenz, the maximum nominal high-pressure specification p_HD_max_soll and the actual high pressure p_HD_ist in the area of the lines 9 or 10 and the hydraulic machines 2 and 3. To be able to implement the maximum nominal high-pressure specification p_HD_max_soll to the desired extent and to avoid function-critical pressure values in the area of the hydraulic machines 2 and 3 or the lines 9 and 10 to the necessary extent, the aggressiveness of the high-pressure limiting function or the dynamic of the pivoting of the hydraulic machines 2 and 3 can be adapted to the operating condition variation existing at the time, to the extent necessary for this, in the manner described in more detain below. In this context, a high dynamic or high aggressiveness can be produced by opening wide the control valve unit 11 and a rapid transmission ratio change or high adjustment rate of the hydraulic machines 2 and 3 can be achieved.

Depending on the application at the time, it is possible for example for the adjustment rate of the swept volumes of the hydraulic machines 2 and 3, or the aggressiveness, to be kept low if a difference between the actual high pressure p_HD_ist and the pressure limit value p_HD_grenz is small. For example, this is the case in the variation of the actual high pressure p_HD_ist illustrated in FIG. 4 up to the time point T1. Between times T1 and T2 the difference between the actual high pressure p_HD_ist and the pressure limit value p_HD_grenz is larger, for which reason the dynamic or aggressiveness shown are also larger. From time T2 onwards the difference between the actual high pressure p_HD_ist and the pressure limit value p_HD_grenz increases further and the aggressiveness or adjustment rate of the swept volumes of the hydraulic machines also continues increasing in order to move the actual high pressure p_HD_ist within desired, shorter operating times in the direction toward the maximum nominal high-pressure specification p_HD_max_soll. In general the aggressiveness can be made the greater, the more the maximum nominal high-pressure specification p_HD_max_soll or the pressure limit value p_HD_grenz are exceeded, in order to be able to produce a required operating condition variation.

Alternatively or in addition, the aggressiveness can also be changed as a function of the gradient of the difference between the variation of the actual high pressure p_HD_ist and the variation of the maximum nominal high-pressure specification p_HD_max_soll. In this case, when there are large positive gradients of the difference between the variation of the actual high pressure p_HD_ist and the variation of the maximum nominal high-pressure specification p_HD_max_soll, the aggressiveness can be set in such manner that the CVT transmission can be operated with a high level of spontaneity and function-critical operating conditions can be avoided more reliably. When the sign of the gradient of the difference between the variation of the actual high pressure p_HD_ist and the variation of the maximum nominal high-pressure specification p_HD_max_soll is positive and its value is medium, the aggressiveness can be reduced, whereas when the gradient of the difference between the variation of the actual high pressure p_HD_ist and the variation of the maximum nominal high-pressure specification p_HD_max_soll is small or negative, the adjustment rate of the swept volumes of the hydraulic machines 2 and 3 above the pressure limit value p_HD_grenz must be made small in order to be able to obtain, for a driver of a vehicle made with the CVT transmission, driving behavior that can reasonably be expected.

In the present case, FIG. 5 shows that the adjustment rate of the swept volumes of the hydraulic machines 2 and 3 above the pressure limit value p_HD_grenz in the area of the lines 9 and 10 that connect the hydraulic machines 2 and 3 to one another, up to a time 14 of the variation of the actual high pressure p_HD_ist, is high, whereas between times T4 and T5, relative to the adjustment rate prior to time 14 the aggressiveness is made smaller owing to the smaller gradient of the difference between the variation of the actual high pressure p_HD_ist and the variation of the maximum nominal high-pressure specification p_HD_max_soll. From time T5 onward the adjustment rate of the swept volumes of the hydraulic machines 2 and 3 above the pressure limit value p_HD_grenz is reduced further, since the gradient of the difference between the variation of the actual high pressure p_HD_ist and the variation of the maximum nominal high-pressure specification p_HD_max_soll is first essentially equal to zero and then becomes negative.

This prevents the actual high pressure p_HD_ist from falling below the maximum nominal high-pressure specification p_HD_max_soll to an undesired extent within short operating times in such manner that a vehicle would show driving behavior not expected by a driver at the time.

Furthermore, it is possible to specify the adjustment rate of the swept volumes of the hydraulic machines, or the aggressiveness, as a function of the currently existing high pressure in the area of the hydraulic machines 2 and 3 or the lines 9 and 10, and for example to set the aggressiveness differently during overdrive and during traction operation. Moreover, it can also be provided that the aggressiveness is set as a function of a driver's wish to slow down or as a function of a driving range currently engaged in the CVT transmission.

In order to be able to specify the adjustment rate or aggressiveness in each case to the desired extent in a manner adapted to the relevant application, it is possible to adopt only one of the options described above for varying the aggressiveness, or any desired combination of them, and to specify the adjustment rate.

Both the initiation point of the pressure limiting function, i.e. the pressure limit value p_HD_grenz, and also the aggressiveness, can be set by the control system in almost any desired way. By virtue of the flexible control system it is possible in a simple manner to reproduce the most varied characteristics of the control valve unit 11.

By means of the device 1 according to the invention illustrated in FIG. 1 or FIG. 2, traction force limitation in the area of a drive output of a CVT transmission designed in the manner described above, and thus a load-sensing capacity in combination with transmission protection, can be obtained as a function of the customer's wishes, the currently existing driving situation, the currently engaged driving range, a driver's wish to slow down, a condition of the CVT transmission, i.e. during traction or overdrive operation, or as a function of the activation or deactivation of the high-pressure limiting function, or the like, in a simply and inexpensively designed manner which at the same time entails little actuation complexity.

INDEXES

1 Device
2 Hydraulic machine
3 Hydraulic machine

4 Piston-cylinder device
5 Axis
6 Axis
7 Piston of the piston-cylinder device
7A, 7B Functional surfaces of the piston
8 Piston rod
9 Line
10 Line
11 Control valve unit
12A, 12B Piston spaces
13 Proportional magnet
14 Spring device
15 Mechanical link
16 Valve slide of the control valve unit
17 Unpressurized area
18 High-pressure limiting valve
19 High-pressure limiting valve
20 Valve device
21 Line section
22 Device
23 High-pressure sensor
24 High-pressure sensor
p_HD_grenz Pressure limit value
p_HD_ist Actual high pressure
p_HD_max_soll Maximum nominal high-pressure specification
t Time
T1 to T6 Discrete time points

The invention claimed is:

1. A device (1) for varying swept volumes of a first hydraulic machine (2) and a second hydraulic machine (3), the swept volumes depending, in each case, on pivoted positions of adjustable axes (5, 6) of the first and the second hydraulic machines (2, 3) which are connectable to one another by first and second lines (9, 10),
the axes (5, 6) of the first and the second hydraulic machines being couplable to a double-action piston-cylinder device (4) which has functional surfaces that are acted upon by pressures that are adjustable in an area of a control valve unit (11) for pivoting the axes (5, 6),
the pressures in an area of the first and the second hydraulic machines (2, 3) are limitable by the control valve unit (11),
the control valve unit (11) being couplable, by a valve device (20), to a more highly pressurized one of the first and the second lines (9, 10), the valve device having one inlet connected to the first line and another inlet connected to the second line, and the valve device has an outlet that is couplable to the control valve unit,
a further device (22) being couplable downstream of the valve device and upstream of the control valve unit, the further device determines an existing actual pressure value (p_HD_ist) upstream of the control valve unit (11) such that an actual pressure and pressure sides of the first and the second hydraulic machines (2, 3), upstream of the valve device (20), are determinable by the further device (22) at least in an area of one of the first and the second lines (9) that connect the first and the second hydraulic machines (2, 3), and the control valve unit (11) can be actuated as a function of the actual pressure value (p_HD_ist) that is determinable by the further device (22),
the control valve unit (11) is a 4/2 control valve having a valve slide (16) that is displaced, from a first end position toward a second end position, by a variable control force that acts in opposition to a further variable control force that acts on the valve slide (16),
the swept volumes of the first and the second hydraulic machines (2, 3) above a variable pressure limit value (p_HD_grenz) in the area of the first and the second lines (9, 10) connecting the first and the second hydraulic machines (2, 3) to one another, can be brought, by a corresponding adjustment of the further variable control force acting on the valve slide (16) of the control valve unit (11), to values at which the pressure in the first and the second lines is at a level of the variable pressure limit value (p_HD_grenz),
the pressure limit value (p_HD_grenz) is either lower than or equal to a maximum nominal pressure value (p_HD_max_soll) to be set in the area of the first and the second lines (9, 10) connecting the first and the second hydraulic machines (2, 3), which is required for transmitting a defined torque between the first and the second hydraulic machines (2, 3), and
an adjustment rate of the swept volumes of the first and the second hydraulic machines (2, 3) above the pressure limit value (p_HD_grenz), in the area of the lines (9, 10) connecting the hydraulic machines (2, 3) to one another, are variable as a function of a difference between an actual pressure value (p_HD_ist) and the maximum nominal pressure value (p_HD_max_soll) in the area of the first and the second lines (9, 10) connected to the first and the second hydraulic machines (2, 3).

2. The device according to claim 1, wherein the existing actual pressure value (p_HD_ist) in the area of the one of the first and the second lines (9 or 10) that connect the first and the second hydraulic machines (2, 3) and downstream from the valve device (20) which is functionally connected to both of the first and the second lines that connect to the first and the second hydraulic machines (2, 3) and is in a form of a two-way valve, are determinable by the further device (22), and a line section provided downstream from the valve device (20) is always coupled, by way of the valve device (20), to the one of the first and the second lines (9 or 10) connecting the first and the second hydraulic machines (2, 3) in which the actual pressure value (p_HD_ist) is highest at the time.

3. The device according to claim 1, wherein the actual pressure value (p_HD_ist) is determined by the further device (22) in either the area of the first and the second lines (9, 10) that connect the first and the second hydraulic machines (2, 3) to one another, or at least in a line section connected thereto.

4. The device according to claim 1, wherein the further device (22) is made with first and second high-pressure sensors (23, 24).

5. The device according to claim 4, wherein one of a pressure-side switch or a first one of either the first or the second high-pressure sensors (24) is arranged either in the one of the first and the second lines that connect the first and the second hydraulic machines or in a line section connected to the one of the first and the second lines (10), and the other one of the pressure-side switch or a second one of the first and the second high-pressure sensors (23) is provided between the valve device (20) and the control valve unit (11).

6. The device according to claim 4, wherein one of a pressure side switch or a first one of the first and the second high-pressure sensors (23) is arranged either in the first line (9) that connects the first and the second hydraulic machines or in the line section (21) connected to the first line (9), and the other one of the pressure-side switch or a second one of the first and the second high-pressure sensors (24) is arranged in either the second line (10) that connects the first and the second hydraulic machines or in a line section connected to the second line (10).

7. The device according to claim 1, wherein the further device is made with a sole high-pressure sensor and a pressure-side switch.

8. The device according to claim 1, wherein a piston (7) of the double-action piston-cylinder device (4) is functionally connected to the valve slide (16) of the control valve unit (11), and the further variable control force acting on the valve slide (16) varies as a function of a position of the piston (7).

9. The device according to claim 8, wherein the variable control force acting on the valve slide of the control valve unit (11) is variable as a function of a transmission ratio of a transmission device made with the first and the second hydraulic machines (2, 3), and the transmission ratio is determinable in an area of the device and which varies as a function of the swept volumes of the first and the second hydraulic machines (2, 3).

10. A device (1) for varying swept volumes of a first hydraulic machine (2) and a second hydraulic machine (3), the swept volumes depending, in each case, on pivoted positions of adjustable axes (5, 6) of the first and the second hydraulic machines (2, 3) which are connectable to one another by first and second lines (9, 10);

the axes (5, 6) of the first and the second hydraulic machines being couplable to a double-action piston-cylinder device (4) which is acted, upon by pressures, in an area of functional surfaces that are adjustable in an area of a control valve unit (11) for pivoting the axes (5, 6);

the pressures in an area of the first and the second hydraulic machines (2, 3) are limitable by the control valve unit (11);

the control valve unit (11) being couplable, by a valve device (20), to one of the first and the second lines (9, 10) in which the pressure is highest;

a further device (22) being provided for determining an existing actual pressure value (p_HD_ist) upstream of the control valve unit (11) such that an actual pressure and pressure sides of the first and the second hydraulic machines (2, 3) upstream of the valve device (20) are determinable by the further device (22) at least in an area of one of the first and the second lines (9) that connect the first and the second hydraulic machines (2, 3), and the control valve unit (11) can be actuated as a function of the actual pressure value (p_HD_ist) that is determinable by the further device (22);

the control valve unit (11) is a 4/2 control valve having a valve slide (16) that is displaced, from a first end position toward a second end position, by a variable control force that acts in opposition to a further variable control force that acts on the valve slide (16);

the swept volumes of the first and the second hydraulic machines (2, 3) above a variable pressure limit value (p_HD_grenz) in the area of the first and the second lines (9, 10) connecting the first and the second hydraulic machines (2, 3) to one another, can be brought, by a corresponding adjustment of the further variable control force acting on the valve slide (16) of the control valve unit (11), to values at which the pressure in the first and the second lines is at a level of the variable pressure limit value (p_HD_grenz); and an adjustment rate of the swept volumes of the first and the second hydraulic machines (2, 3), above the pressure limit value (p_HD_grenz) in the area of the lines (9, 10) connecting the hydraulic machines (2, 3) to one another, are variable as a function of a gradient of the variation of a difference between an actual pressure value (p_HD_ist) and a maximum nominal pressure value (p_HD_max_soll) in the area of the first and the second lines (9, 10) connected with the first and the second hydraulic machines (2, 3).

* * * * *